Oct. 30, 1962     F. V. JOHNSON ET AL     3,060,752
GYROSCOPE
Filed Sept. 7, 1949

Inventors:
Frithiof V. Johnson;
Harold H. P. Lemmerman,
by Harry P. Mayers
Their Attorney.

United States Patent Office 3,060,752
Patented Oct. 30, 1962

3,060,752
GYROSCOPE
Frithiof V. Johnson, Scotia, and Harold H. P. Lemmerman, Schenectady, N.Y., assignors to General Electric Company, a corporation of New York
Filed Sept. 7, 1949, Ser. No. 114,382
16 Claims. (Cl. 74—5.6)

This invention relates to gyroscopic devices and more particularly to gyroscopes of the single axis type.

In their application to stabilizing objects such as aircraft, missiles, turrets and optical or radar tracking systems gyroscopes are usually carried on the device to be stabilized. Changes in direction or angular velocity are detected by gyro pick-off devices which transmit error signals to servo mechanisms calling for necessary motion or velocity of the object being stabilized to maintain the error at zero. Torque motors are used to change the direction of the stabilized line by precessing the gyroscope.

In addition to having a torque motor, prior single axis gyros have usually had a spring restraint on the pivot axis for the purpose of restraining the precession of the gyro to a precession rate equal to the rate of turn of the stabilized object about an axis at right angle to the spin axis and the pivot axis. However, spring restraint is not desirable in gyros intended for accurate rate measurement or stabilization because errors in the servo system give rise to gyro errors of unpredictable magnitude. If, for example, the servo momentarily fails to correct the angular displacement of the object, the torque stored in the restraining spring acts to precess the gyro independently of the servo, and the gyro thereafter assumes a false reference axis. Therefore, a permanent error is produced in the heading of the gyro which is not corrected after the servo has regained control.

An electrical feedback loop around the gyro may be used to simulate the required damping, but such an electrical feedback requires a considerable amount of electronic equipment and involves difficult problems in combining the primary input and feedback currents without loss of accuracy.

Gyros also have a natural frequency of oscillation with which they respond to shocks or disturbances, and this oscillation causes still further trouble in the servo system.

It is an object of our invention therefore to provide novel restraining means in a gyroscopic device.

Another object of our invention is to provide viscous damping without resorting to external fluid damping means which are always subject to leakage at the rotating seals.

Still another object of our invention is to provide improved means for damping the natural frequency of vibration of a gyroscope.

According to our invention, a single axis gyroscope is enclosed in an air-tight or hermetically sealed cylindrical container. This cylindrical container or enclosure is suspended axially on bearings so as to pivot at right angles to the gyro spin axis within a cylindrical outer housing which is closely fitted to it. The space between the inner cylindrical container and the outer housing is then filled with a viscous fluid such as silicone oil. A pick-off device is located at one end of the pivot axis of the gyro container, and at the other end there is located a torque motor for precessing the gyro. The viscous fluid serves as a damping medium and has the property of storing up any rate errors in the form of angular displacement between the container and the housing and yet under static conditions, no restoring torque is produced independently of normal servo operation. Thus, when the pick-off ultimately returns to its zero signal position, no false precession will have occurred to disturb the original stabilized direction of the object.

The invention will be more fully understood by referring now to the accompanying drawings wherein.

Figure 1:
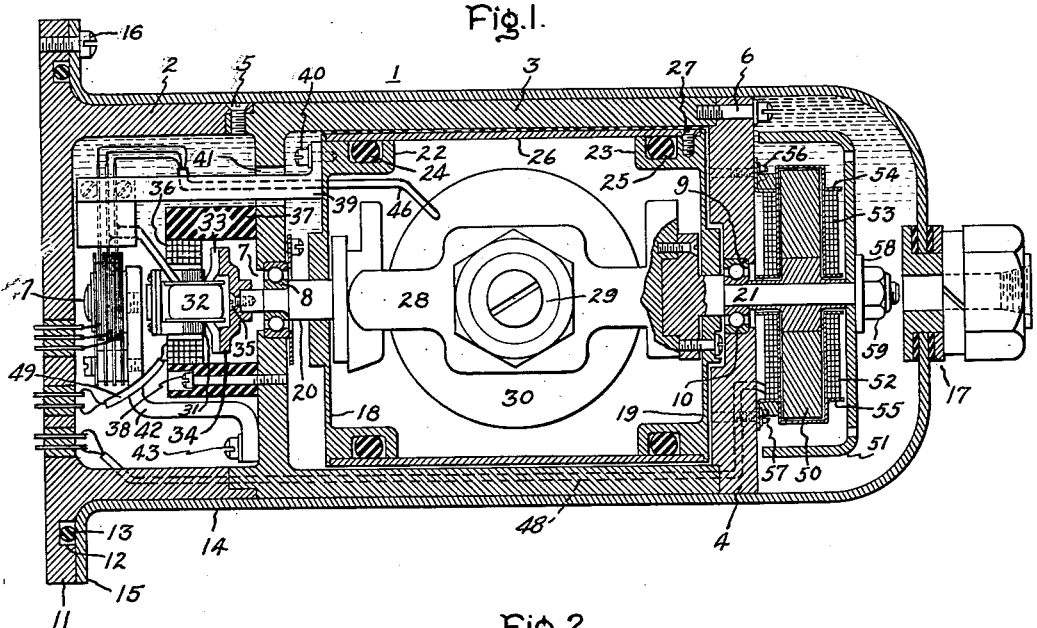
FIG. 1 is an elevational view in section of our novel gyroscope.

Referring now to FIG. 1 there is shown a cylindrically-shaped base or housing 1 which consists of several subassemblies 2, 3 and 4 rigidly connected together such as by bolts 5 and 6. The end wall at the left of housing subassembly 3 is provided with a central opening 7 into which is inserted a bearing 8. Subassembly 4 comprises a circular endwall also having a central opening 9 into which there is placed another bearing 10 similar to bearing 8. The two bearings 8 and 10 are adapted to pivotally support shafts 20 and 21 along the longitudinal axis of the housing 1. Subassemblies 2, 3 and 4 may be made of any suitable material such as brass.

Subassembly 2 has an annular flange 11 having a groove 12 in which there is recessed a ring gasket 13. A cylindrically-shaped cover 14 also flanged at 15 to correspond with the housing flange 11 is adapted to fit snugly over the housing 1 and to be secured thereagainst by means of bolts such as at 16 which may be tightened thus compressing gasket 13 so as to completely seal the area within cover 14.

The cover 14 is provided with a sealable connector indicated generally at 17 which serves the purpose of passing a viscous fluid into or out of the space enclosed by the cover 14.

Located within subassembly 3 is a rotatable member or support comprising endwalls 18 and 19 to which are rigidly attached shafts 20 and 21 adapted to rotate respectively about the axis of bearings 8 and 10. The two endwalls 18 and 19 have inwardly extending annular flanges 22 and 23 at their peripheries and these are respectively grooved to accommodate ring gaskets, 24 and 25. A cylindrical sleeve 26 extends between endwalls 18 and 19 thereby forming a fully enclosed chamber which is hermetically sealed by the ring gaskets 24 and 25. Bolts such as at 27 secure the cylindrical sleeve 26 to each of the flanges 22 and 23.

The outer diameter of the cylindrical sleeve 26 is only slightly less than the inner diameter of subassembly 3.

The gyro rotor 30 is mounted in a support member 28 which is fixedly connected between the ends 18 and 19. The gyro rotor 30 is supported by means of bearings (not shown) which are adjusted by means shown generally at 29. The gyroscope rotor 30 is suspended so that its spin axis OX (FIG. 2) is at right angles to the pivot axis OY about which the shafts 20 and 21 rotate.

The gyroscope whose rotor is shown at 30 is entirely conventional and may be of the 400 cycle, 12,00 r.p.m. synchronous type for example which comprises an externally energized stator and rotor member.

It will be clear from the description thus far that we have a sealed rotatable enclosure closely fitted to rotate axially within an outer housing and this enclosure contains a gyroscope.

Figure 2:
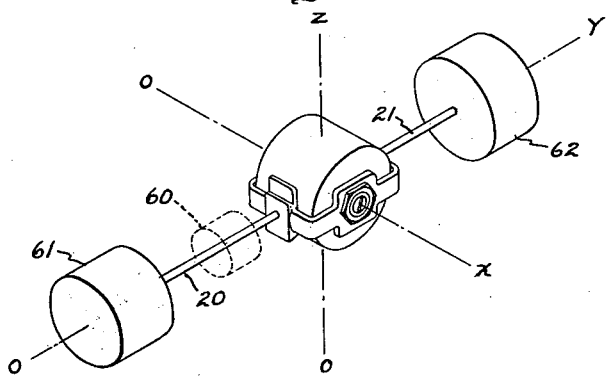
FIG. 2 is a diagramatic representation of the elements of our invention.

Referring to FIG. 2, illustrating these components schematically, when our gyroscopic device is mounted on a navigable craft such as a missile which is traveling in the direction of the gyro spin axis OX, any deviation about the sensitive axis OZ, which is at right angles to both axes OX and OY, causes the gyro to precess and the shafts 20, 21 to rotate about the pivot axis OY in a direction depending upon the direction of spin of the gyroscope and the direction of deviation about OZ. In order to measure the amount of deviation, a conventional single phase pickoff device is mounted on the shaft 20 so as to provide an error signal depending upon the magnitude and direction of deviation.

The comparatively simple construction of the preferred pickoff is well known. Briefly, it consists of two parts, a rotor which is attached to the shaft 20 and a stator which is fixed with respect to the housing subassembly 3. The rotor 31 is composed of a group of dumbbell shaped iron laminations around which a coil 32 is wound. Fixed to the iron laminations is a mounting bracket 33 which is detachably secured to a bracket 34 mounted on the extreme left end of shaft 20 by means of bolts such as 35. Thus, any rotation of the shaft 20 results in a corresponding rotation of the pickoff rotor 31. The stator winding 36 is of the Gramme ring type and is supported on a cylindrical bracket 37 which is fixed to the endwall of the housing subassembly 3 by bolts, one of which is shown at 38. The stator winding 36 is connected to a cable 49 having leads which are carried out through glass seals.

An extension bracket 39 is attached to endwall 18 by a bolt 40. This bracket extends through an arcuate opening 41 in the endwall of the housing subassembly 3 and its angular rotation is therefore limited. The bracket 39 provides a means for carrying a cable 46 comprising three leads to the gyro for energizing its three phase 400 cycle motor. These leads may be brought through the endwall 18 through glass seals. Also connected to bracket 39 are the two leads from the pickoff rotor winding 32. Thus it will be apparent that the bracket 39 rotates with the pickoff rotor 31 and there is no relative motion between the two leads to the rotor winding 32 and the bracket 39.

Another bracket 42 extends from the wall of housing subassembly 3 and is secured by means of a bolt 43. On bracket 42 there are mounted flexible connector means 47 comprising a plurality of conducting spirals. These serve the purpose of flexibly connecting the three phase leads from the gyro and the leads from pickoff coil 32, which are mounted on the moving bracket 39, to a point on subassembly 2. All leads may be carried through the subassembly 2 by means of glass seals, as shown.

In order that gyro 30 can be precessed, a torque motor is mounted on the pivot axis to apply a rotating force to the shaft 21. This torque motor comprises the familiar circular magnetic disk 50 and a shallow steel cup 51 radially supported on the shaft 21.

The windings 52 and 53 about the upper and lower halves of the magnetic disk 50 are conventional and as shown in FIG. 1 resemble spools of wire wound on forms 54 and 55 respectively which fit closely over the magnet. The coil forms 54 and 55 are fixedly supported on the housing subassembly 4 by means of bolts such as 56 and 57. A shallow steel cup 51 which fits over the entire assembly forms the magnetic return path. The shaft 21 is threaded so that a washer 58 and a retaining nut 59 keep the steel cup 51 on the shaft 21. The windings 52 and 53 are connected by leads from a cable 48 which may be recessed in a groove along the housing and carried out through glass seals.

After our gyroscopic device has been completely assembled, it is filled, through the sealable opening 17, with a heavy damping fluid. This fluid should be one preferably having a negligible variation in viscosity in the temperature range within which the device is to be used. A heavy silicone oil would be particularly suitable since the viscous torque gradient would then be sufficiently high as to make it unnecessary to employ additional damping means such as vanes. The rotating container and its attached accessories may be balanced so as to place both the center of mass and the center of buoyancy on the axis of suspension 20, 21 in order to eliminate torque should the temperature and thus the density of the liquid vary.

The desired ratio of gyro motion to change in missile heading may be obtained by judicious selection of fluid viscosity. In actual tests, it was found that ratios of approximately three to one and ten to one were obtained when using oils having viscosities of 4900 and 13,600 centistokes respectively. The lower of these would be suitable for most guidance purposes.

By choosing a fluid of high viscosity it is possible to use our invention for telemetering purposes. For example, a total rotation of 180° about the OZ axis would be translated into a rotation of 9° about the OY axis and this could be transmitted from a linear pickup. For such an application it is desirable to have the temperature of the damping fluid remain constant. It is not necessary however that the viscosity be constant, at least not over any great length of time. It is sufficient that it be essentially constant over a period which is long compared with any single error excursion.

A better understanding of our invention may be had from the following brief mathematical analysis when considered in connection with FIG. 2 which schematically shows an exploded schematic view of the components of our invention.

We can assume that the viscous damper 60, the pickoff 61 and the torque motor 62 acts about the OY axis in the coordinate system shown. The gyro 30 spins about the OX axis and responds to rotation about its sensitive axis OZ by deflecting about the OY axis.

For purpose of the discussion below, mathematical symbols are defined as follows:

$\theta_X$ = angular displacement measured about the X axis.
$\theta_Y$ = angular displacement measured about the Y axis.
$\theta_Z$ = angular displacement measured about the Z axis.
$\dot{\theta}_X$ = angular rate about the X axis.
$\dot{\theta}_Y$ = angular rate about the Y axis.
$\dot{\theta}_Z$ = angular rate about the Z axis.
$I$ = angular momentum of the gyro.
$T$ = torque motor output.
$K_D$ = viscous damping coefficient.
$t$ = time.

If the angular rate of the object about the OZ axis is $\dot{\theta}_Z$, then the torque required on the OY axis is $I\dot{\theta}_Z$.

But this torque $I\dot{\theta}_Z$ is equal to the sum of the torque $T$ due to the torque motor plus the torque $K_D\dot{\theta}_Y$ due to damping action.

$$T + K_D\dot{\theta}_Y = I\dot{\theta}_Z$$

or $$\int T\,dt + K_D\theta_Y = I\theta_Z$$

$$\theta_Z = \frac{1}{I}\int T\,dt + \frac{K_D\theta_Y}{I}$$

Therefore when the servo has controlled the missile so that the pickoff error is O, that is $\theta_Y = O$, then $$\theta_Z = \frac{1}{I}\int T\,dt$$

If the torque motor input becomes zero, for example, due to servo failure, then $$\theta_Z = \frac{K_D}{I}\theta_Y$$

which means that $\theta_Z$ errors are stored up as proportional displacements in $\theta_Y$.

An error velocity about the sensitive axis OZ would necessarily be accompanied by a proportional torque about the pivot axis OY. Such a torque could be supplied only by the viscous damper, and only by a proportional velocity between the rotor and the stator of the damper. This is equivalent to saying that the gyro would rotate about the damper axis OY at a speed directly proportional to the error velocity about the OZ axis, and the total displacement of the gyro about the OY axis would be proportional to the integrated error rate about the OZ axis. The proportionality constant would depend on the angular momentum for gyro and on the torque versus velocity constant of the damper.

It follows that when the craft controls have functioned to restore the output signal from the gyro pickoff to zero, the error about the OZ axis must have been reduced to 0. This is the characteristic lacked by the spring restrained gyro.

Although the schematic diagram of FIG. 2 suggests that a means for damping could be located external to the gyro assembly it will be apparent that some errors would arise if coulomb friction were present on the damper axis and it would be difficult to avoid leakage problems inherent in rotating seals. Therefore, it will be appreciated that by our invention, we attain desired viscous damping with a compact unit without any of the drawbacks due to leakage since our device is completely sealed.

With the foregoing understanding of the elements and their organization, the operation of our invention will be more readily understood from the following explanatory comparison.

Assume that a craft carrying our gyroscopic device is traveling along the OX axis. Assume further that any deviations to the left of this direction of travel about the OZ axis will cause the uppermost part of the gyro to tilt forward thus causing the pickoff device to rotate away from its initial zero signal position. Such deviation will now cause the pickoff device to transmit an error signal to the external servos calling for correction in the heading of the craft and therefore of the gyro. Due to servo action the gyro and the pickoff device will be restored to its initial position of zero error signal position. This represents normal operation and providing the servo responds promptly no serious problems are presented if spring restraint is employed instead of viscous restraint.

Assume now that the craft deviates from its course but that due to overload or to any of many factors which might cause malfunctioning of the system, the servo is incapable of responding momentarily to make the required correction in the missile heading as indicated by the error signal transmitted from the pickoff device. Now, were a spring restraint applied to the pivot axis, during the temporary lull of servo inaction, the spring restraint would now start to apply an independent torque which would tend to precess the gyro in a direction to restore the pickoff device to the zero signal position despite the fact that no servo action had taken place to correct the initial craft deviation. Thus, by the time the servo regained control and was prepared to make its correction the gyro would have acquired a new and untrue reference axis. The disadvantages of spring restraint should now be apparent and the improved operation which derives from viscous restraint will be more readily appreciated.

Assume now that the craft is traveling in the direction of the gyro spin axis OX and that a change in heading takes place to the left about the OZ axis. The rotatable enclosure containing the gyro will then be caused to rotate due to precession and the pickoff device will transmit an error signal to the servos calling for the necessary correction in the craft heading. Although the inner rotatable enclosure will have slowly moved to a new position under viscous restraint, it will be noted that the damping fluid will not apply any return torque at its new position as was characteristic of spring restraint. Accordingly, even though the servo mechanism is temporarily incapacitated, the error signal of the pickoff device remains unchanged and until the servo ultimately regains control, it stands by to indicate that a heading correction is still required. The servo will then respond to effect the correction called for thus restoring the pickoff device to its initial zero signal position. Thus it will be seen that viscous damping provides a memory action which is lacking with spring restraint.

Whenever it is desired to make a change in the tracking position of the gyro, this is accomplished by energizing the torque motor so as to cause the gyro to precess until the new reference axis is reached. The operation of a torque motor per se to cause precession is well understood.

While a particular embodiment of our invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of our invention.

What we claim is:

1. A gyroscopic device comprising a cylindrical fluid-tight housing, a viscous fluid in said housing, a cylindrical fluid-tight container coaxially positioned in said housing and pivotally mounted for angular displacement about its axis relative to said housing, said container being immersed in said fluid and having its outer cylindrical wall in proximate spaced relation to said cylindrical housing, a bracket fixed in said container, and a gyro rotor fixedly mounted in said bracket with its spin axis perpendicular to the pivotal axis of said container, said viscous fluid presenting substantially the sole restraining means between relative movement of said container and housing upon precession of said gyro rotor and fixed container about said pivotal axis, signal generating means responsive to relative angular displacement about said pivotal axis between said housing and said container, and motor means interposed between said container and housing for angularly displacing said container relative to said housing.

2. A gyroscopic device comprising a fluid-tight housing, a viscous fluid in said housing, a fluid-tight container positioned within said housing and pivotally mounted for angular displacement about one axis relative to said housing, said container being immersed in said fluid and having its outer surface in proximate spaced relation to said housing, a bracket fixed in said container, and a gyro rotor fixedly mounted in said bracket with its spin axis perpendicular to the pivotal axis of said container, said viscous fluid presenting substantially the sole restraining means between relative movement of said container and housing upon precession of said gyro rotor and fixed container about said single axis, signal generating means responsive to relative angular displacement about said single axis between said housing and said container, and motor means interposed between said container and housing for angularly displacing said container relative to said housing.

3. A gyroscopic device comprising a cylindrical fluid-tight housing, a viscous fluid in said housing, a cylindrical fluid-tight container coaxially positioned in said housing and pivotally mounted for angular displacement about an axis relative to said housing, said container being immersed in said fluid and having its outer cylindrical wall in proximate spaced relation to said cylindrical housing, a bracket fixed in said container, and a gyro rotor fixedly mounted in said bracket with its spin perpendicular to the pivotal axis of said container, said viscous fluid presenting substantially the sole restraining means between relative movement of said container and housing upon precession of said gyro rotor and fixed container about said pivotal axis, and signal generating means immersed in said fluid and responsive to relative angular displacement about said pivotal axis between said housing and said container.

4. A gyroscopic device comprising a cylindrical fluid-tight housing, a viscous fluid in said housing, a cylindrical fluid-tight container coaxially positioned in said housing and pivotally mounted for angular displacement about an axis relative to said housing, said container being immersed in said fluid and having its outer cylindrical wall in proximate spaced relation to said cylindrical housing, a bracket fixed in said container, and a gyro rotor fixedly mounted in said bracket with its spin axis perpendicular to the pivotal axis of said container, said viscous fluid presenting substantially the sole restraining means between relative movement of said container and housing upon precession of said gyro rotor and fixed container about said pivotal axis, and motor means mounted within said housing and immersed in said fluid and being interposed between said container and housing for angularly displacing said container relative to said housing.

5. In a single axis rate gyroscope, a fluid-tight housing, a member pivotally mounted within said housing, a fluid-tight container fixedly supported by said member, a gyro rotor pivotally supported within said container about a spin axis fixed relative to said container and perpendicular to the pivotal axis of said member, a pickoff having a portion thereof associated with said housing and a portion thereof associated with said member for generating a signal proportional to the relative rotative movement therebetween, motor means interconnecting said housing and member for applying a rotative torque to said member; said pickoff, container, and motor means being associated with said member along said rotative axis in linear arrangement, and a viscous fluid within said housing inundating said pickoff, container, and motor means.

6. A single axis rate gyroscope comprising a fluid-tight housing, a member rotatably supported within and supported by said housing, a fluid-tight container supported by said member, a gyro rotor pivotally mounted within said container about a spin axis fixed relative to said container, and perpendicular to the rotative axis of said member, a pickoff within said housing having a portion thereof associated with said housing and a portion thereof associated with said member for generating a signal proportional to relative rotative motion therebetween, a viscous fluid within said housing and immersing said container, member, and pickoff; said viscous fluid presenting substantially the sole restraining means between relative movement of said container and housing upon precession of said gyro rotor.

7. A single axis rate gyroscope including a fluid-tight housing, a member rotatably mounted within and supported by said housing, a fluid-tight container supported by said member, a gyro rotor pivotally mounted within said container about a spin axis fixed relative to said container and perpendicular to the rotative axis of said member, motor means within said housing and interconnecting said housing and member for applying a rotative torque to said member, a viscous fluid within said housing and immersing said container, member, and motor means; said viscous fluid presenting substantially the sole restraining means between relative movement between said container and housing upon precession of said gyro rotor.

8. A gyroscopic device comprising a cylindrical fluid-tight housing, a cylindrical fluid-tight container coaxially positioned in said housing and pivotally mounted for angular displacement about a single axis relative to said housing, said container having its outer cylindrical wall in proximate spaced relation to said cylindrical housing, a bracket fixed in said container, a gyro rotor fixedly mounted in said bracket with its spin axis perpendicular to the pivotal axis of said container, signal generating means responsive to relative angular displacement of said housing and said container, motor means interposed between said container and housing for angularly displacing said container relative to said housing; said container, signal generating means, and motor means being arranged within said housing in linear array, a viscous fluid filling said housing and immersing said container, signal generating means, and motor means; said viscous fluid presenting substantially the sole restraining means between relative movement of said container and housing upon precession of said gyro rotor and fixed container about said pivotal axis.

9. In the device of claim 8, said viscous fluid comprising a silicone oil having a viscosity within the range of 4,900–13,600 centistokes.

10. A gyroscopic device comprising a fluid-tight housing, a shaft pivotally supported on bearings within said housing, a fluid-tight container fixedly mounted on a central portion of said shaft, a torque motor supported within said housing and connected to one end portion of said shaft to rotatably drive said shaft, a pickoff supported within said housing and driven by the other end of said shaft to generate signals proportional to rotative movement thereof, and means for both minimizing the frictional load on the shaft bearings and restraining the rate of rotation of the shaft and container, said means consisting of a viscous fluid within said housing immersing said shaft, container, pickoff, and torque motor.

11. In the device of claim 10, said viscous fluid comprising a silicone oil having a viscosity within the range of 4,900–13,600 centistokes.

12. A rate and rate integrating gyroscopic device comprising a fluid tight housing, a fluid tight container pivotally mounted within said housing, the outer wall of said container being in proximate space relation to the inner wall of said housing, and a gyro rotor pivotally mounted within said container about a spin axis fixed relative to said container and perpendicular to the pivotal axis of said container, and means for both minimizing the frictional load between relative movement of said container and housing upon precession of said gyro rotor about said container pivotal axis and restraining the rate of rotation of said container, said means consisting of a viscous fluid within said housing immersing said container, said viscous fluid having a viscosity within the range of 4,900–13,600 centistokes.

13. In the device of claim 12, a pickoff supported within said housing and immersed within said viscous fluid, said pickoff being responsive to relative rotation between said container and housing for generating an electrical signal proportional thereto.

14. In the device of claim 12, a torque motor immersed in said viscous fluid and supported by said housing for rotating said container within said housing.

15. A single-degree-of-freedom gyroscopic unit comprising a case, a gyro assembly, a chamber in which the gyro assembly is mounted, support means for rotatably supporting the chamber in the case and a buoyant fluid filling the case and surrounding the chamber, said fluid being of sufficient viscosity and the chamber of such size and shape that deflections of the chamber are resisted by a torque substantially proportional to the velocity of deflection.

16. A single-degree-of-freedom gyroscopic unit comprising a case, a gyro assembly, which includes a gyro rotor and a frame in which it spins, a chamber in which the gyro assembly is mounted, a shaft and bearings for rotatably supporting the chamber in the case, and a buoyant fluid filling the case and surrounding the chamber, said fluid being of sufficient viscosity and the chamber of such size and shape that deflections of the chamber are resisted by a torque substantially proportional to the velocity of deflection.

References Cited in the file of this patent

UNITED STATES PATENTS

| Number | Name | Date |
|---|---|---|
| 1,480,637 | Schuler | Jan. 15, 1924 |
| 1,743,533 | Davis | Jan. 14, 1930 |
| 1,773,172 | Davis | Aug. 19, 1930 |
| 1,940,387 | Boykow | Dec. 19, 1933 |
| 2,109,283 | Boykow | Feb. 22, 1938 |
| 2,382,727 | Kronenberger | Aug. 14, 1945 |
| 2,409,178 | Allison et al. | Oct. 15, 1946 |
| 2,584,125 | Haglund | Feb. 5, 1952 |
| 2,584,222 | O'Connor | Feb. 5, 1952 |
| 2,591,697 | Hays | Apr. 8, 1952 |
| 2,592,417 | Hale | Apr. 8, 1952 |
| 2,612,692 | Weiss | Oct. 6, 1952 |